United States Patent
De Bonis-Hamelin et al.

(10) Patent No.: US 6,789,214 B1
(45) Date of Patent: Sep. 7, 2004

(54) PROCESS FOR RECONFIGURING AN INFORMATION PROCESSING SYSTEM UPON DETECTION OF A COMPONENT FAILURE

(75) Inventors: Marie-Antoinette De Bonis-Hamelin, Saint-Egreve (FR); Zoltan Menyhart, Meylan (FR); Jean-Dominique Sorace, Lancey (FR)

(73) Assignee: Bull, S.A., Louveciennes (FR)

( * ) Notice: Subject to any disclaimer, the term of this patent is extended or adjusted under 35 U.S.C. 154(b) by 754 days.

(21) Appl. No.: 09/583,984

(22) Filed: May 31, 2000

(30) Foreign Application Priority Data

Jun. 10, 1999 (FR) .............................................. 99 07350

(51) Int. Cl.⁷ ................................................ H02H 3/05
(52) U.S. Cl. ............................................. 714/15; 714/3
(58) Field of Search .............................. 714/15, 2, 3, 7, 714/9, 16, 20

(56) References Cited

U.S. PATENT DOCUMENTS

| | | | |
|---|---|---|---|
| 3,812,468 A | | 5/1974 | Sharp et al. |
| 4,402,045 A | * | 8/1983 | Krol ............................ 712/29 |
| 5,588,112 A | * | 12/1996 | Dearth et al. ................... 714/9 |
| 5,953,530 A | * | 9/1999 | Rishi et al. ................... 717/127 |
| 6,105,146 A | * | 8/2000 | Tavallaei et al. ................. 714/2 |

FOREIGN PATENT DOCUMENTS

EP 0 472 864 A 3/1992

* cited by examiner

Primary Examiner—Dieu-Minh Le
(74) Attorney, Agent, or Firm—Miles & Stockbridge P.C.; Edward J. Kondracki

(57) ABSTRACT

The invention relates to a process for dynamically reconfiguring an information processing system (1), particularly a so-called "SMP" symmetric multiprocessor system. The process comprises a preliminary step for detecting a failure risk of one of the components of the system (CPU3). Following this detection, the system (1) is placed in a coherent, so-called "frozen" state in a first step with the aid of programs (J1–J4) executing specific tasks. A second step consists of reconfiguring the system by reallocating/deallocating all or some of the components (CPU1–CPU4). In a third step, the component (CPU3) that presents a failure risk is isolated. The pending interruptions (4) are processed and the current tasks (6) are executed prior to the "freeze." Likewise, the queues of tasks to be executed are purged prior to the "freeze." Then, the subsequent tasks and interrupts are inhibited until a final step that consists of releasing the system (1).

35 Claims, 2 Drawing Sheets

PROCESS FOR RECONFIGURING AN INFORMATION PROCESSING SYSTEM UPON DETECTION OF A COMPONENT FAILURE

FIELD OF THE INVENTION

The invention relates to a "warm" process for dynamically reconfiguring an information processing system upon detection of a failure of at least one component.

The invention applies more particularly to multiprocessor systems, and even more particularly to symmetric multiprocessor systems of the "SMP" type.

BACKGROUND OF THE INVENTION

Within the context of the invention, the term "component" should be considered in its most general sense. It includes hardware components, for example a processor in a system of the aforementioned "SMP" type, as well as software components, for example one of the modules of the operating system.

The term "failure" should also be understood in its most general sense. Naturally, it can refer to malfunctioning components. However, within the context of the invention, it most often refers to one or more components having a high risk of actually malfunctioning.

These are generally situations in which a parameter associated with the operation of one of the components of the system moves above or below a predefined critical threshold. To illustrate the concept, let us take the example of the detection and correction of errors in data recorded in a processor's random access memory. It is normal to record redundant data in addition to the data actually used, and to use an error correction mechanism known by the abbreviation "EEC" (for "Error Correcting Code"). This mechanism uses the redundant data to correct the errors detected. However, one may decide, as a preventative measure, to consider all or part of this random access memory to be malfunctioning if the detected error rate passes a predetermined threshold, and to stop using this memory or memory part.

It is easy to see that the "shutdown" of a component, no matter which one, poses a certain number of problems, and cannot be done without certain precautions. This component essentially constitutes what is known as a computing resource (hardware or software) of the information processing system. First of all, if it is currently running (for example processing a task, if it is a processor) or being used by other components of the system, it cannot be shut down immediately. It is necessary for the current operation to finish, or at least be taken over by other components. If not, serious and irrecoverable errors (data losses, etc.) can occur. It is then necessary to isolate the malfunctioning component from the other parts of the system. Finally, it is most often necessary to reconfigure the system while waiting for the defective component to be repaired and/or replaced.

All these operations, especially the last two, require a shutdown of all or part of the system.

For certain applications using what are called high-availability systems, a halt in operation is unacceptable.

Even outside the field of these specific applications, current requirements tend toward this need for high availability.

From the point of view of the user or the client, the concept of high availability often constitutes a major factor in the choice of a system. It is now common to expect continuous operation, i.e., 24 hours a day, 7 days a week.

Hardware is becoming more and more complex and specialized, accordingly requiring higher reliability in order to obtain at least the same availability and life cycle as in the past, given that current requirements tend to increase. These requirements are most critical for the very high-capacity systems known as "mainframes."

It follows that new maintenance procedures need to be used: all maintenance interventions must henceforth be planned. The object is to disturb the normal operation of the system as little as possible. In fact, any unplanned maintenance generates extremely high costs and/or losses. These losses and costs naturally have a substantial impact on the user or client's confidence.

More particularly, there is a specific problem relative to the hardware components. It is necessary to replace components that are likely to malfunction, which generally requires a shutdown of the machine. But the machine, in keeping with the aforementioned requirements, must continue to operate, which is clearly incompatible.

Also in the prior art, the proposed solutions have tended to favor the aforementioned high availability. For this reason, so-called "hardware" solutions are used. These solutions generally involve a specific configuration, and may require equally specific software drivers.

These solutions can be categorized as follows:

a connection during operation called a "hot plug": this involves a subassembly of specialized circuits that makes it possible to isolate, disconnect and replace the so-called malfunctioning components;

a machine architecture called a "cluster," in which several machines work together: if one of the machines malfunctions, another machine belonging to the set replaces it, taking advantage of the fact that the data are redundant and distributed among these machines; and a (so-called "multipath") hardware redundancy, in which two or more components work in parallel: if one of the components malfunctions, the other parallel components take over.

This last variant ensures a "two-out-of-three" redundancy.

All of these solutions have drawbacks:

a connection during operation of the "hot plug" type requires the existence of specialized circuits, which in turn generates increased complexity in the system and a corresponding increase in the cost of production, and the method requires special support from the operating system and cannot be applied to existing systems after the fact;

by nature, a "cluster" of machines is constituted by at least two complete machines: the hardware redundancy is therefore substantial and the need to use a specific operating system for this type of system architecture results in a very high cost; and hardware redundancy is, a priori, the most expensive of the techniques, since it involves multiplying all of the components constituting the system, or at least the majority of them.

SUMMARY OF THE INVENTION

The object of the invention is to eliminate the drawbacks of the processes and devices of the prior art, some of which have just been mentioned.

The subject of the invention is a process that makes it possible to meet the needs that have arisen without having the drawback of the processes and devices according to the prior art, some of which have just been mentioned.

According to the process of the invention, it is no longer specifically necessary to provide some type of hardware redundancy.

For this reason, according to a first important characteristic, the process according to the invention comprises steps that, upon detection of a component failure, allow a temporary "freeze" of the system in a way that may be called "warm" or "on the fly," i.e. to halt, in an orderly fashion, all of the activities in progress at a so-called coherent break point in the system's operation. This "freeze" consists in a mutual exclusion mechanism.

The term "failure" should be understood in the sense indicated above, i.e., generally an estimated failure risk.

Once this state is obtained, a reconfiguration of the system is then performed. In essence, it becomes possible to perform a dynamic reallocation or a de-allocation of any resource of the system, whether hardware or software: processor, memory, software module (including a part of the operating system), or any other component.

To do this, according to another important characteristic of the invention, specific processes or tasks are implemented, which are run in a non-preemptive and synchronized manner, under the control of one of the so-called master processes or of a component serving as such.

The malfunctioning component is then isolated from the system.

Finally, the operating system of the system is released and the system can once again run normally.

It must be clearly understood that all of the preceding steps are transparent for the operating system, for the user (system administrator, etc.) and also for the user applications. It has also been indicated that the malfunctioning component could be one of the modules of the operating system itself.

In practice, the only constraints that apply are the following:

the execution time must be reasonable, i.e., compatible with the type of application in question and/or the type of machine used (operating speed, basic clock cycle, etc.); and the degradation in performance that results from the reconfiguration (isolation of the component declared to be malfunctioning) should be imperceptible, or at least not very noticeable.

While the first condition is difficult to achieve, it is possible, according to a variant of the process, at least for certain applications, to divide the process into segments. In other words, it takes place in several successive phases, each phase making it possible to perform part of the global process, until it is completed.

In a preferred variant of the invention, the process is applied to multiprocessor systems, particularly to so-called "SMP" systems, as indicated, and even more particularly to an operating system environment of the "UNIX" (registered trademark) type. But it must be clearly understood that the process of the invention applies to the vast majority of information processing system architectures, as long as certain minimum operating characteristics, which will be specified below, are satisfied.

Hence, the subject of the invention is process for reconfiguring an information processing system comprising components forming hardware and software resources, and running under the control of a given operating system, in which at least one so-called user application is being run, characterized in that it comprises at least the following steps:

a preliminary step consisting of detecting a pre-established failure risk in at least one of said components;

a first step consisting, after said detection of a failure risk, of activating at least one specific program for executing a specific job (J1–J4) under the control of said operating system, in a non-preemptive mode, in order to place said information processing system in a predetermined coherent, so-called "frozen" state, in which each of said user applications currently running is halted in an orderly fashion, and no other application is allowed to be run;

a second step for executing said specific job for reconfiguring said information processing system by performing operations for reallocating and/or de-allocating all or some of said components of this system, in order to prepare for the isolation of each of said components for which said pre-established failure risk has been detected;

a third step consisting of isolating each of said components for which said failure risk has been detected, so that it is no longer recognized by said information processing system and no longer constitutes one of said resources; and a final step for releasing said information processing system, again allowing its operation and the running of at least one of said user applications.

BRIEF DESCRIPTION OF THE DRAWINGS

The invention will now be described in greater detail in reference to the attached drawings, in which.

DESCRIPTION OF THE PREFERRED EMBODIMENT(S)

Without in any way limiting the scope of the invention, the description will keep to the framework of the preferred application of the invention unless stated otherwise, i.e., to the case of a so-called "SMP" symmetric multiprocessor system, and to an operating system environment of the "UNIX" type.

Figure 1:
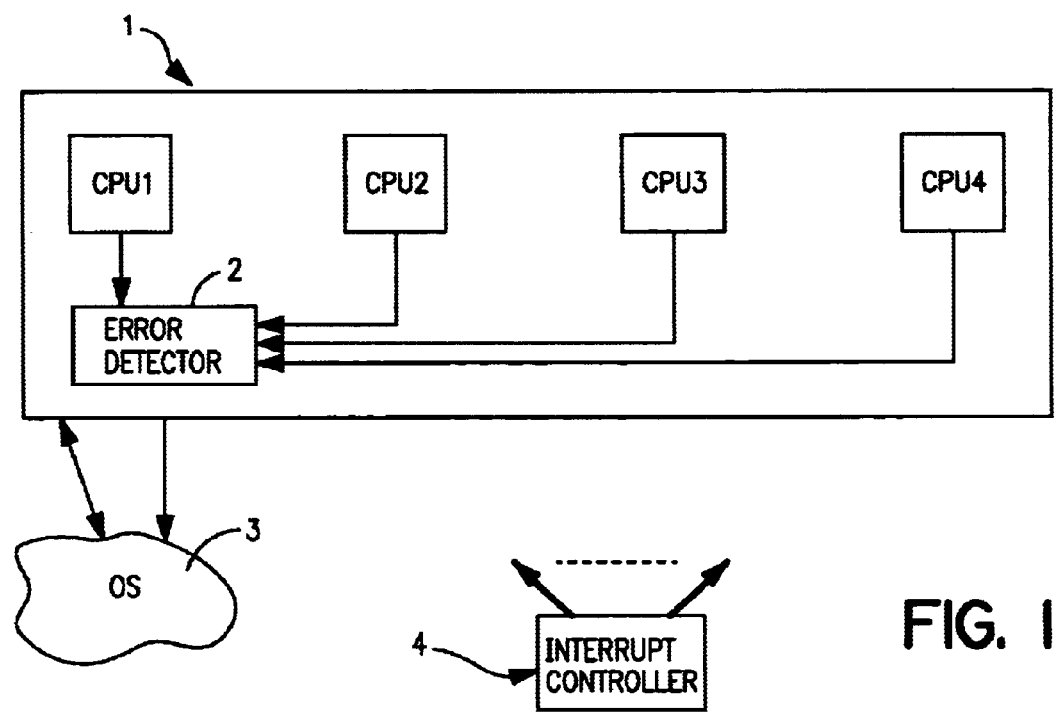
FIG. 1 schematically illustrates an exemplary symmetric multiprocessor architecture of the so-called "SMP" type.

FIG. 1 schematically illustrates an architecture of this type. The system 1 represented comprises four processors CPU1 through CPU4.

For the simple purpose of illustrating the process, the component of the system 1 that is likely to malfunction will be considered to be one of the processors CPU1 through CPU4. Also, in order to simplify the drawing, the other normal components of the system 1 (shared memory, mass storage, various peripherals, etc.) are not represented. To facilitate the description, it has also been assumed that the system comprises a centralized device 2 for detecting errors. In practice, the detection of the error risk is performed by the potentially malfunctioning component, a hardware or software component, and not by an external device.

As indicated, the detection of the failure risk of one of the components is generally obtained through the monitoring of pre-established parameters and of the passing of given thresholds associated with these parameters, or through similar processes. The device 2 for detecting malfunctioning components communicates with the operating system 3. Also represented in FIG. 1 is an interrupt controller 4. Usually, interrupt signals of given levels are transmitted to the various processors, depending on the type of task to be performed and depending on the peripheral device (not represented) that initiates it.

Let us assume that the processor CPU3 is detected as being a potentially malfunctioning component by the detection device 2.

Figure 2:
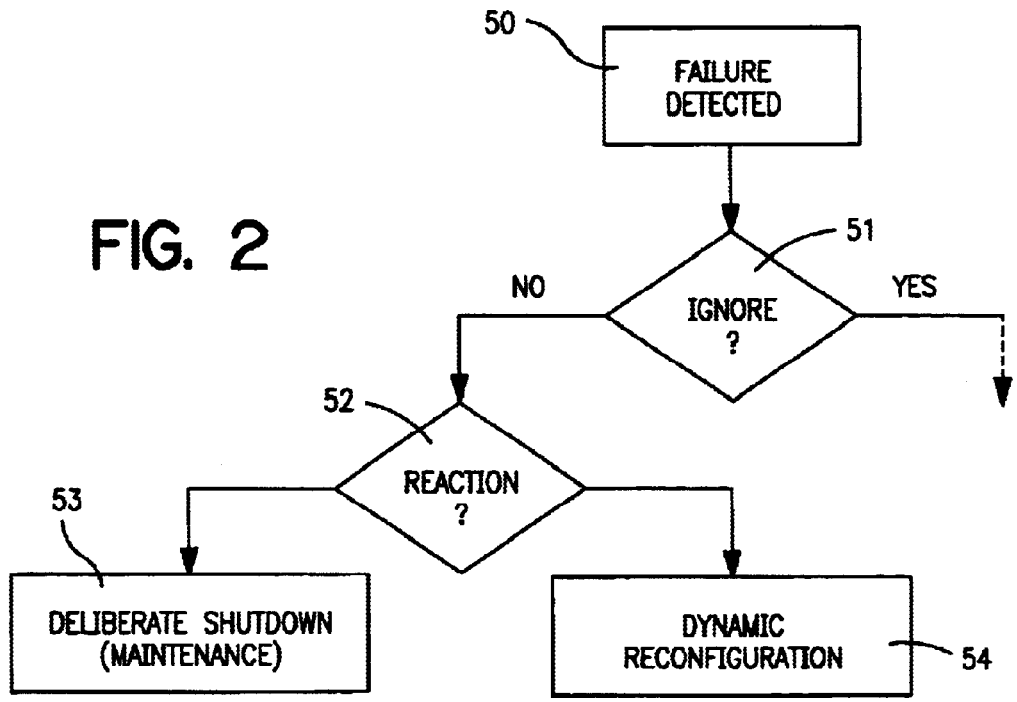
FIG. 2 is a flow chart illustrating the possible choices in the event of a detection of a malfunctioning element in the architecture of FIG. 1.

FIG. 2 is a flow chart representing the alternatives that may be pursued in this circumstance. In 50, the error detection device emits a specific signal indicating that the processor CPU3 has been declared to be malfunctioning. In 51, the operating system can decide to ignore this warning ("YES" branch), which may result in an undesired stoppage or "crash" of the system 1, in which the CPU3 actually does malfunction and may result in a harmful error and/or irreparable damages (data losses, etc.). If the warning is not ignored ("NO" branch), the action performed in 52 can consist either of a deliberate shutdown of the system 1 (in order to perform a deliberate but unprogrammed maintenance operation) in 53, of a "warm" dynamic reconfiguration in 54. If the system is shut down, it is clear that even if the consequences are, a priori, less serious than in the first alternative considered (ignoring the warning), the availability of the system cannot be guaranteed, precisely because of this shutdown. "Warm" dynamic reconfiguration, on the other hand, directly involves the process according to the invention.

Figure 3:
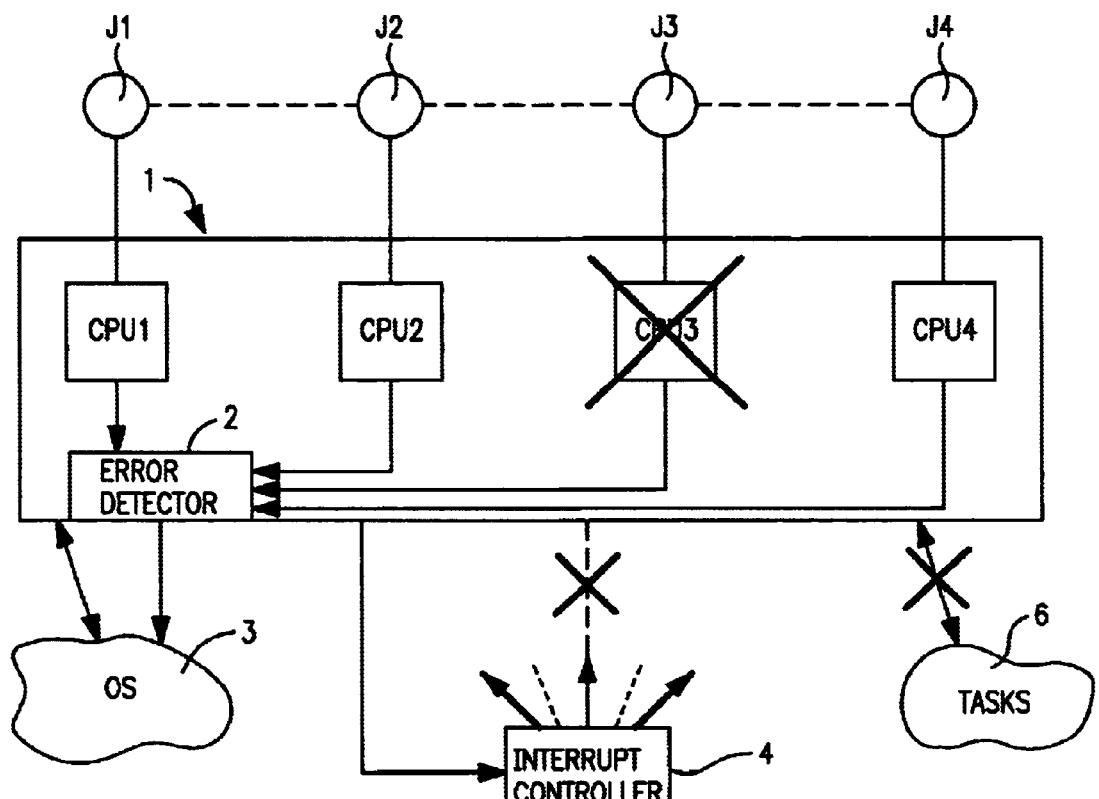
FIG. 3 illustrates in greater detail the architecture of FIG. 1 for implementing the dynamic reconfiguration process according to the invention.

Let us now refer to FIG. 3, which illustrates in greater detail than in FIG. 1, the main elements involved in the "warm" dynamic reconfiguration process according to the invention.

The elements common to FIG. 1 have the same references and will only be described again as necessary.

Since the error detection device 2 has detected a failure of the processor CPU3, the latter, according to an important characteristic of the invention, must be deactivated, in other words, isolated from the system 1.

FIG. 3 represents three major "functions" that characterize the operation of an information processing system, i.e., the operating system "OS" 3, a function that will be described as a software function related to the user tasks 6 currently being processed in one or more processors, and a function that will be described as a hardware function related to the external interruptions generated by one or more interrupt controllers, symbolized by a single device 4. Within the context of the invention, the term "task" should be understood in its most general sense. The terminology used also depends on the environment (operating system) in question. The term "task" specifically includes the following English terms and their French equivalents: "process," "thread," "task," or "job."

For the processor CPU3 to be effectively deactivated, it is necessary for it to be no longer be involved in any of the above functions, or for it to no longer be accessible to them. This state is symbolized by "X" in FIG. 3. However, this is not the only condition to be fulfilled. It is in fact necessary that no further task be executed by this processor until it has been repaired or replaced. It is also necessary that the current tasks be terminated normally, in order to avoid any abnormal operation and/or data loss. It is also necessary for the current interrupts to be processed normally.

Finally, it is necessary to control what is being executed in the other processors, i.e., in the example described, the processors CPU1, CPU2, and CPU4. In essence, in the multiprocessor system 1, one or more processors, for example the processor CPU1, can request access to the tasks currently being processed in the processor CPU3, or can send it a task to perform or data. This risk is even higher in the case of a multiprocessor system of the "SMP" type, i.e., symmetrical as indicated above. The operating system "OS" 3 does not fully control the distribution of the tasks, precisely because of the overall symmetry of the system.

Also, according to a fundamental characteristic of the process according to the invention, the entire system 1 will be "frozen" and not just the component that is malfunctioning or declared to be so. This "freeze," however, lasts for only a short time lapse. The qualifier "short" should be understood in relation to the nature of the applications run in the system and to other functional characteristics (speed of the processors, cycle time, etc.). According to another important characteristic, the "freeze" of the system 1 is transparent for a user and for the operating system.

Figure 4:
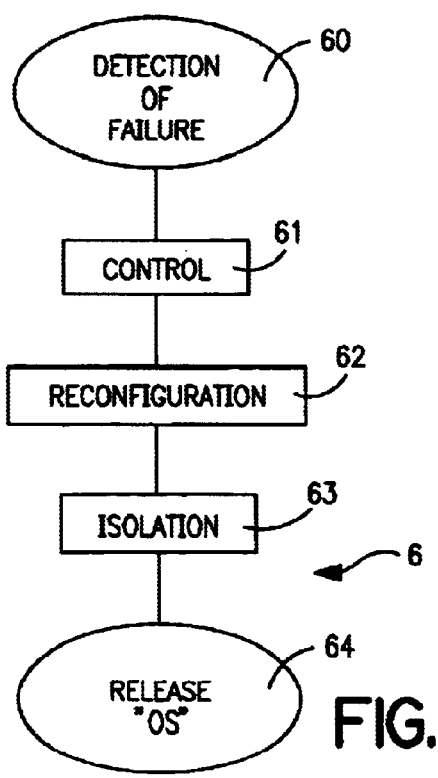
FIG. 4 is a diagram illustrating the main steps of the dynamic reconfiguration process according to the invention.

FIG. 4 is a flow chart 6 showing the main steps of the process according to the invention.

In 60, the error detection device 2 detects a failure of the processor CPU3, as described above.

The first step 61, which will hereinafter be called the "control" step, specifically consists of obtaining control over the functions indicated above. To do this, during a first step, each of the processors CPU1 through CPU4 is associated with a specific task. These tasks are executed by specific programs or pieces of software, under the control of the operating system "OS" 3. These specific tasks will be called "jobs," in this case J1 through J4, and more generally J1 through Jn, if the system includes n processors. It must be noted that one job, J3, is associated with the malfunctioning processor CPU3. According to another characteristic, the jobs are of the non-preemptive type, even if the operating system allows this mode of operation. The work is done in the exclusive mode. The jobs are synchronized with one another and are under the control of a so-called "master" component of the system.

Advantageously, it is one of the specific jobs J1 through J4 that plays this role. The synchronization is generally obtained through a central storage device (not represented), which remains in the shared mode. The synchronization can be performed in any known way, for example by means of a bit mask.

This way, the master job waits until the other jobs have finished executing the actions or tasks that are specific to them. It can also distribute tasks to be completed to the other jobs.

The specific jobs must no longer be interrupted by external interruptions. For this reason, the operating system 3 acts on the interrupt controller 4 (FIG. 3).

Through this mechanism, the operation of the system 1 is completely controlled and the latter, in a predictable and orderly way, is placed in a predetermined state.

This state will make it possible to move to the next step, or reconfiguration step 62. During this step, the specific jobs J1 through J4 "reconfigure" the hardware and software architecture of the system 1, in order to adjust to the failure of the processor CPU3. In practice, this translates into the updating of configuration tables or similar elements, and the reallocation of the resources composing the system 1, with a view to deactivating the processor CPU3.

Step 63 consists in the actual isolation of the malfunctioning processor CPU3. The latter is then no longer recognized by the operating system 3 (FIG. 3). In other words, it no longer appears in the list of available resources.

The last step 64 consists in the release of the operating system 3, which allows the system 1 to run again. The external interrupts can then again be transmitted to the remaining processors CPU1, CPU2 and CPU4, and the tasks 6 can be distributed to these processors.

According to another characteristic of the process of the invention, the specific jobs J1 through J4 "self-destruct," i.e., spontaneously terminate, no later than during the final step 63 for releasing the operating system 3.

In order for the "warm" dynamic reconfiguration process according to the invention to run correctly, it is necessary for the actual "freeze" of the system to be obtained within a maximum time lapse, as indicated. To do this, it is simply necessary to define a time interval predetermined once and for all, or determined as a function of the applications currently running. This time interval is generally called a "timeout." This parameter is called at the beginning of step 61, or prior to the initiation of the latter, and compared to a time interval signal delivered by an appropriate clock circuit. It must be noted that not all of the functionalities of the system 1 are "frozen," even if the system is globally frozen in accordance with the primary characteristic of the process of the invention. The majority of the hardware resources continue to run and remain available. This is especially true of the clock signal generating circuits. It is therefore possible, for example, to use one of the counters of the system, fed by clock signals, to determine whether the operations of steps 61 through 63 are included within the time interval allowed.

If the process is too slow and cannot be completed within this allowed time interval, it is possible, in a variant of the process, to "atomize" it, i.e., to break it down into a series of successive temporary "freeze" phases, interspersed with releases of the operating system. Thus, the system 1 is progressively brought to a state that allows the effective isolation of the malfunctioning component, for example the processor CPU3. This is achieved during the final "freeze" phase, after which the operating system is finally released, the new configuration of the system 1, which excludes the defective component, having been obtained.

Generally, it is necessary to perform additional steps. These steps consist not only of terminating the tasks in progress, as mentioned above, but also of executing the tasks waiting to be processed, particularly in the malfunctioning processor CPU3. Moreover, it is also necessary to process the waiting interrupts. If not, the corresponding tasks would run the risk of being irretrievably lost.

Figure 5:
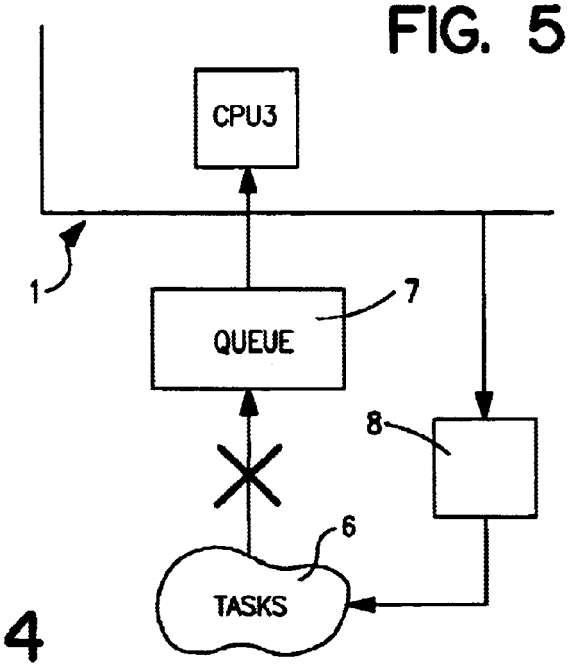
FIG. 5 schematically illustrates one particular step of this process.

FIG. 5 schematically illustrates one of the additional steps. In a customary and well-known way, the system 1 is associated with queues, represented under the general reference 7, which receive a list of priority tasks to be processed. This generally involves storage devices of the "first in first out" or "FIFO" type. These devices determine the order in which the tasks should be processed. It is therefore necessary to perform an operation that will be called a "purge" of the queue 7, in order to clear it. Moreover, to avoid its being refilled, it is also necessary to inhibit the tasks "at the source." The system 1 is generally equipped with a device called a "dispatcher" 8 (task scheduler) or similar device, whose role is precisely to distribute the tasks to be processed, specifically taking into account their relative priorities. The device 8 is then acted on in order to obtain the aforementioned inhibiting at the source. This action can be performed under the control of one of the specific jobs. The normal operation of this device 8 is again allowed after the release of the operating system (FIG. 4: step 64) Given that by then the system 1 has been reconfigured and the malfunctioning component (the processor CPU3 in the example described) has been de-allocated, the tasks that could have been sent to it are (re-)directed to one of the valid processors CPU1, CPU2 or CPU4.

As for the external interrupts, again referring to FIG. 3, the operation of the interrupt controller 4 need only be temporarily halted, while allowing the current interruptions to be executed. This operation, symbolized by an "X" at the outputs of the interrupt controller 4, can also be performed under the control of one of the specific jobs. As before, the operation of the interrupt controller 4 will again be allowed and the interrupts will again be handled after the release of the operating system (FIG. 4: step 64). The same condition as before applies: new interrupts can no longer be directed to the processor CPU3, which is no longer known to the operating system 3 and hence to the interrupt controller 4 that is under its control.

To illustrate the concepts, without thereby limiting the scope of the invention in any way, one possible practical exemplary implementation of the "warm" dynamic reconfiguration process just described will now be examined in detail, in the case of a symmetric multiprocessor architecture called "MPC," and in a "UNIX" (registered trademark) or similar operating system environment.

First, upon detection of a failure of one of the processors (or more precisely when a processor is declared to be malfunctioning in the manner described above), a first command or instruction called "freeze system" will be executed. This command can have the configuration of an interrupt instruction, as indicated below:

$$\text{Int freeze\_system(int(*m\_fun( ), cpu\_t cpu, uint time\_out, void*arg)} \quad (1)$$

an instruction in which "freeze_sytem" is the name given to the latter, "m_fun" is a pointer to a function invoked when the system is effectively "frozen" prior to the expiration of a predetermined time limit "time_out", "cpu" represents the logical number of the processor to which the "freeze_sytem" command is applied, "time_out" is the aforementioned time limit (generally in milliseconds) for obtaining a mutual exclusion, and "arg" is an argument representing a data structure that will be passed to the function "(m_fun)( )".

When the system has effectively been "frozen," the function "m_fun" is executed in a processor by the argument "cpu". If the time limit "time out" expires, it means that the "freeze_sytem" command has failed. The system is then released unconditionally.

This command ensures:
the preemption and the saving of the contexts of the processes (or "threads") executing tasks, ensuring the proper functioning of the system;
the inhibiting of the interrupts at the interrupt sources, i.e., the interrupt controllers;
the inhibiting of the clock requests, and
the inhibiting of the so-called "MPC" (MultiProcessor Interrupt) mechanism.

All of the waiting interrupt are executed. The system is said to be in a "coherent state." All of the current tasks are properly terminated.

The system is said to be "frozen." The function "m_fun" passed in an argument to the command "freeze_system( )" is then able to take control and execute the task incumbent on it, in a protected manner. This task is dedicated, for example, to the dynamic allocation/deallocation of a processor.

The particular processor that executes this function is arbitrarily called the "freeze master."

The aforementioned "freeze system" function, executed after the actual obtainment of the latter, can create other tasks, also executed during the "system freeze." These tasks are called "freeze slaves." They are executed in the other processors, under the control of the master processor ("freeze master") and an additional command or instruction that can have the following configuration:

Void start_freeze_command(void(*s_fun)( ), cpu_t cpu,
        void*arg)                                          (2), an instruction in which "start_freeze_command" is the name given to the instruction, "s_fun" is a pointer to a "freeze slave" function to be executed, "cpu" represents the logical number of the processor in which the function "s_fun" is executed, and "arg" is a pointer to a data structure of the private type. This data structure establishes the communication protocol between the "freeze master" processor and the "freeze slave" processor or processors, so as to obtain the aforementioned synchronization through the private data structure pointed to by "arg".

If the time limit "time_out" (see command (1)) has not expired prior to the mutual exclusion of the system, i.e., the "system freeze," the "freeze master" function has the capability to command one of the "freeze slave" processors to execute the function "s_fun( )". The latter can, for example, modify the private data of one of the processors of the system, including the one in which the "freeze master" command is executed.

A communication protocol is established between the "freeze master" processor and the "freeze slave" processor or processors, or between the tasks being executed in them, which amounts to the same thing.

When all the commands of the "freeze slave" type have terminated, the "freeze master" processor can also terminate its task. A this instant, the "freeze" on the system can be lifted and the system can return to normal operation.

Through the reading of the above, it is easy to see that the invention achieves the objects set forth.

The warm dynamic reconfiguration process according to the invention does not require any hardware redundancy. The hardware and software architecture of the system remains unchanged. It is simply necessary for the system to have error detection means, either hardware or software, which are provided by most information processing systems. Only the operating system needs to be modified in order to support a limited number of specific instructions, and what have been called "specific jobs."

It should be clear, however, that the invention is not limited to just the exemplary embodiments explicitly described, particularly in connection with FIGS. 1 through 5.

In particular, the numerical values, for example the number of processors, have been indicated only in order to illustrate the concepts. They essentially depend on the precise application referred to.

It should also be clear that even though particularly well adapted to a so-called "MPC" symmetric multiprocessor system in a "UNIX environment, the invention is not limited to this type of application.

Finally, although the process has been described in detail in the case of a detected malfunctioning processor, the process according to the invention, as indicated above, is in no way limited to this particular application. Furthermore, the components that are malfunctioning, in the sense given to this term, can be hardware or software components. Nor is the process according to the invention limited to just one malfunctioning component.

The number of specific jobs activated depends on the nature of the component or components declared to be malfunctioning. In the case of one or more processors of an SMP system that are declared to be malfunctioning, which case has been the subject of a detailed description in order to give a non-limiting example, a specific job is executed by a processor, under the supervision of one of the jobs, called a master. For other types of components, hardware or software, it may be sufficient to execute only one specific job. In the latter case, the problem of synchronizing the execution of the jobs does not arise.

The process according to the invention can be applied to the architectures of a wide variety of information processing systems. The minimum conditions to be fulfilled are limited in number. It is particularly necessary to be able to control the interrupt sources and to be able to inhibit the tasks in a coherent manner, which most computer systems allow.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A process for reconfiguring an information processing system comprising a plurality of components forming hardware and software resources, and running under the control of a given operating system, in which at least one user application is being run comprising:

detecting a pre-established failure risk in at least one of said components in a preliminary step;

after said detection of a failure risk, a first step of activating at least one specific program for executing a specific job, under the control of said operating system, in a non-preemptive mode, in order to place said information processing system in a predetermined coherent frozen state, in which each user application currently running is halted in an orderly fashion and no other application is allowed to be run;

executing in a second step said specific job for reconfiguring said information processing system by performing operations for reallocating and/or de-allocating all or some of said components of the system, in order to prepare for isolation of each of said components for which said pre-established failure risk has been detected;

isolating each of said components for which said failure risk has been detected in a third step, so that said isolated component is no longer recognized by said information processing system and no longer constitutes one of said resources; and releasing said information processing system in a final step, to allow operation of said information processing system and the running of at least one of said user applications.

2. A process according to claim 1, wherein said component for which said failure risk has been detected is a hardware component.

3. A process according to claim 2, wherein said second step comprises activation of several specific jobs, each associated with a component of said system, and in that one of said specific jobs is designated a master job, in order to synchronize the other specific jobs, the latter designated as slave jobs.

4. A process according to claim 3, wherein said system is a multiprocessor system comprising n processors, and said hardware component for which said failure risk has been detected is one of said processors.

5. A process according to claim 4, wherein said multiprocessor system comprises a storage device with a data structure of a private type in a sharable mode, and said synchronization of the specific jobs is obtained by means of a communication protocol, through said shared data structure.

6. A process according to claim 2, further comprising the step of generating a signal representing a predetermined maximum time interval, the measurement of the time starting from said first step and the continuous comparison of said elapsed time to said predetermined maximum time interval, in order to unconditionally release said information processing system if said elapsed time becomes greater than said predetermined maximum time interval.

7. A process according to claim 2, wherein said preliminary step comprises monitoring the evolution of predetermined parameters associated with each of said components of said information processing system and of detecting the passing of predetermined threshold values, said passing indicating said pre-established risk and triggering said first step.

8. A process according to claim 1, wherein said component for which said failure risk has been detected is a software component.

9. A process according to claim 8, wherein said second step comprises activation of several specific jobs, each associated with a component of said system, and in that one of said specific jobs is designated a master job, in order to synchronize the other specific jobs, the latter being designated as slave jobs.

10. A process according to claim 9, wherein said system is a multiprocessor system comprising n processors, and said hardware component for which said failure risk has been detected is one of said processors.

11. A process according to claim 10, wherein said multiprocessor system comprises a storage device with a data structure of a private type in a sharable mode, and said synchronization of the specific jobs is obtained by means of a communication protocol, through said shared data structure.

12. A process according to claim 8, further comprising the step of generating a signal representing a predetermined maximum time interval, the measurement of the time starting from said first step and the continuous comparison of said elapsed time to said predetermined maximum time interval, in order to unconditionally release said information processing system if said elapsed time becomes greater than said predetermined maximum time interval.

13. A process according to claim 8, wherein said preliminary step comprises monitoring the evolution of predetermined parameters associated with each of said components of said information processing system and of detecting the passing of predetermined threshold values, said passing indicating said pre-established risk and triggering said first step.

14. A process according to claim 1, wherein said second step comprises activation of several specific jobs, each associated with a component of said system, and in that one of said specific jobs is designated a master job, in order to synchronize the other specific jobs, the latter designated as slave jobs.

15. A process according to claim 14, wherein said system is a multiprocessor system comprising n processors, and said hardware component for which said failure risk has been detected is one of said processors.

16. A process according to claim 15, wherein said multiprocessor system comprises a storage device with a data structure of a private type in a sharable mode, and said synchronization of the specific jobs is obtained by means of a communication protocol, through said shared data structure.

17. A process according to claim 16, wherein said information processing system comprises external interrupt sources and at least one controller of said interrupts, and further comprises executing current interruptions before placing said information processing system in said frozen state, and of acting on each of said interrupt controllers in order to prevent subsequent interrupts from being transmitted to said processors and being handled prior to said final step for releasing the information processing system.

18. A process according to claim 16, wherein said information processing system comprises at least one queue storing tasks to be executed in any of said processors, and further comprises executing the tasks stored in each queue before placing said information processing system in said frozen state, and of inhibiting the storing of subsequent tasks prior to said final step for releasing the information processing system.

19. A process according to claim 16, further comprising the step of generating a signal representing a predetermined maximum time interval, the measurement of the time starting from said first step and the continuous comparison of said elapsed time to said predetermined maximum time interval, in order to unconditionally release said information processing system if said elapsed time becomes greater than said predetermined maximum time interval.

20. A process according to claim 16, wherein said preliminary step monitoring the evolution of predetermined parameters associated with each of said components of said information processing system and of detecting the passing of predetermined threshold values, said passing indicating said pre-established risk and triggering said first step.

21. A process according to claim 14, further comprising the step of generating a signal representing a predetermined maximum time interval, the measurement of the time starting from said first step and the continuous comparison of said elapsed time to said predetermined maximum time interval, in order to unconditionally release said information processing system if said elapsed time becomes greater than said predetermined maximum time interval.

22. A process according to claim 14, wherein said information processing system comprises external interrupt sources and at least one controller of said interrupts, and further comprises executing current interruptions before placing said information processing system in said frozen state, and of acting on each of said interrupt controllers in order to prevent subsequent interrupts from being transmitted to said processors and being handled prior to said final step for releasing the information processing system.

23. A process according to claim 22, further comprising the step of generating a signal representing a predetermined maximum time interval, the measurement of the time starting from said first step and the continuous comparison of said elapsed time to said predetermined maximum time interval, in order to unconditionally release said information processing system if said elapsed time becomes greater than said predetermined maximum time interval.

24. A process according to claim 22, wherein said preliminary step comprises monitoring the evolution of predetermined parameters associated with each of said components of said information processing system and of detecting the passing of predetermined threshold values, said passing indicating said pre-established risk and triggering said first step.

25. A process according to claim 14, wherein said information processing system comprises at least one queue storing tasks to be executed in any of said processors, and further comprises executing the tasks stored in each queue before placing said information processing system in said frozen state, and of inhibiting the storing of subsequent tasks prior to said final step for releasing the information processing system.

26. A process according to claim 25, further comprising the step of generating a signal representing a predetermined maximum time interval, the measurement of the time starting from said first step and the continuous comparison of said elapsed time to said predetermined maximum time interval, in order to unconditionally release said information processing system if said elapsed time becomes greater than said predetermined maximum time interval.

27. A process according to claim 25, wherein said preliminary step comprises monitoring the evolution of predetermined parameters associated with each of said components of said information processing system and of detecting the passing of predetermined threshold values, said passing indicating said pre-established risk and triggering said first step.

28. A process according to claim 14, wherein said preliminary step comprises monitoring the evolution of predetermined parameters associated with each of said components of said information processing system and of detecting the passing of predetermined threshold values, said passing indicating said pre-established risk and triggering said first step.

29. A process according to claim 15, wherein said information processing system comprises external interrupt sources and at least one controller of said interrupts, and further comprises executing current interruptions before placing said information processing system in said frozen state, and of acting on each of said interrupt controllers in order to prevent subsequent interrupts from being transmitted to said processors and being handled prior to said final step for releasing the information processing system.

30. A process according to claim 15, wherein said information processing system comprises at least one queue storing tasks to be executed in any of said processors, and further comprises executing the tasks stored in each queue before placing said information processing system in said frozen state, and of inhibiting the storing of subsequent tasks prior to said final step for releasing the information processing system.

31. A process according to claim 15, further comprising the step of generating a signal representing a predetermined maximum time interval, the measurement of the time starting from said first step and the continuous comparison of said elapsed time to said predetermined maximum time interval, in order to unconditionally release said information processing system if said elapsed time becomes greater than said predetermined maximum time interval.

32. A process according to claim 15, wherein said preliminary step comprises monitoring the evolution of predetermined parameters associated with each of said components of said information processing system and of detecting the passing of predetermined threshold values, said passing indicating said pre-established risk and triggering said first step.

33. A process according to claim 1, further comprising the step of generating a signal representing a predetermined maximum time interval, the measurement of the time starting from said first step and the continuous comparison of said elapsed time to said predetermined maximum time interval, in order to unconditionally release said information processing system if said elapsed time becomes greater than said predetermined maximum time interval.

34. A process according to claim 33, wherein said preliminary step comprises monitoring the evolution of predetermined parameters associated with each of said components of said information processing system and of detecting the passing of predetermined threshold values, said passing indicating said pre-established risk and triggering said first step.

35. A process according to claim 1, wherein said preliminary step comprises monitoring the evolution of predetermined parameters associated with each of said components of said information processing system and of detecting the passing of predetermined threshold values, said passing indicating said pre-established risk and triggering said first step.

* * * * *